Patented Mar. 7, 1950

2,500,029

UNITED STATES PATENT OFFICE 2,500,029

CELLULOSE ESTER MATERIALS INSOLUBLE IN ORGANIC SOLVENTS

Hugh J. Hagemeyer, Jr., Kingsport, Tenn., assignor to Eastman Kodak Company, Rochester, N. Y., a corporation of New Jersey No Drawing. Application April 30, 1947, Serial No. 745,095

8 Claims. (Cl. 18—54)

This invention relates to the manufacture of cellulose ester materials obtained by reacting partial esters or ethers of cellulose with diketene and then treating the so-formed material with formaldehyde.

It is desirable that cellulose derivatives materials, especially for textile purposes, have good wet strength and water resistance, a fairly high softening point and resistance to the effect of wear and laundry. Also, it is desirable that such material be resilient, have a good feel, have good dimensional stability and crease proofness.

It is an object of this invention to prepare cellulose derivative materials which in the form of filaments, threads, yarns, ribbons and the like have increased laundry and wearing resistance. Another object of the invention is to prepare a cellulose derivative material, the fibers of which, have good water resistance, wet strength, softening point, resiliency, handle, dimensional stability and crease proofness. A further object of my invention is to prepare a material having these properties by treating cellulose esters or ethers having free hydroxyl groups with diketent and subjecting the so-treated material to the action of formaldehyde or a formaldehyde-forming material. Other objects of my invention will appear herein.

The objects of my invention are accomplished by the acetoacetylation of partial esters or ethers of cellulose with diketene in the presence or absence of a catalyst and subsequently subjecting that material to a treatment with formaldehyde or a formaldehyde-forming compound, particularly after the material has been formed into threads, filaments, ribbons, or the like. Partial esters or ethers of cellulose contain available hydroxyl groups. With the partial esters of cellulose, particularly which are obtained by the hydrolysis or ripening of the triester, the available hydroxyl groups are primary and readily susceptible to acetoacetylation with diketene. In accordance with my invention these partial esters or ethers are reacted with diketene to form a cellulose derivative containing acetoacetic acid radicals. I have found that cellulose derivatives of this nature are readily reacted upon with formaldehyde in the presence of mildly alkaline catalysts to form a material which is insoluble in the ordinary organic solvents and which are resistant to the effects of moisture and wear. As a matter of fact, filaments, threads, yarns, ribbons, or the like, prepared in accordance with the process of my invention do not even exhibit swelling in the common organic solvents.

The reactions which are thought to occur in the process of my invention are as follows:

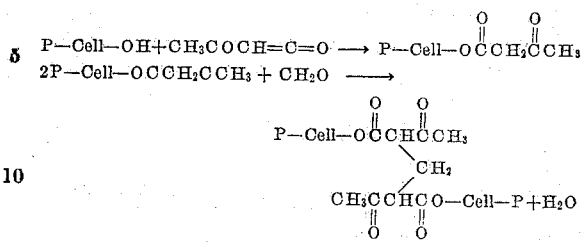

where P-Cell-OH represents the partial cellulose ester or ether containing available hydroxyl groups. One or both of the hydrogen atoms on the methylene carbon can react with formaldehyde to form the cross-linked cellulosic material.

The acetoacetylation of the partial ester or ether of cellulose with diketene may be carried out in several ways. Some ways of carrying out this reaction using a tertiary organic base as a catalyst are described in Caldwell application, Serial No. 745,099, filed of even date. In my invention it is preferred, however, to form a dope or solution of the cellulose partial ester or ether in a suitable inert organic solvent and to add the diketene to that solution. The reaction may be speeded up by heating the mass at a moderate temperature, such as within the range of 40–80° C. After the acetoacetylation is carried out, the product may then be formed into filaments, threads, yarns, ribbons or the like and then treated with a dilute formaldehyde solution containing a trace of a mildly alkaline material. This treatment is preferably carried out at a temperature of 70–80° C. and usually a 3–10% formaldehyde solution is of sufficient strength to accomplish the desired purpose although a larger proportion of formaldehyde is not detrimental.

The starting material for the process in accordance with my invention is any partial organic acid ester or ether of cellulose. This may be cellulose acetate, cellulose acetate propionate, cellulose acetate butyrate, cellulose propionate, cellulose butyrate, or some other cellulose fatty acid ester. It is desirable that the ester employed for the starting material have .1 to 1.5 hydroxyl groups per $C_6$ or glucose unit of cellulose. The ether of cellulose which is most common and which is suitable for use is ethyl cellulose. However, other cellulose ethers, such as benzoyl cellulose or methyl cellulose may be employed. Here again it is desirable that the cellulose ether contain .1 to 1.5 hydroxyl groups per $C_6$ or glucose unit of cellulose.

I have found that the reaction between diketene and the cellulose ester or ether will take place whether at room temperature, without the use of a catalyst, or in the presence of a cellulose esterification catalyst. Some of the catalysts which may be employed to accelerate the acetoacetylation are sodium acetate, pyridine, N-acetyl sulfamic acid, zinc chloride, p-toluene sulfonic acid, and sulfuric acid. This reaction can also be speeded up by using moderate temperatures, such as within the range of 40–80° C. In general it is preferred to carry out the acetoacetylation in the absence of an acid catalyst in order to avoid any degradation of the cellulosic material. When the acetoacetylation is carried out in the absence of an acid catalyst, the mixture obtained can be spun or coated directly without precipitation and neutralization. The amount of diketene which is employed in the reaction need be but little more than that which is necessary to accomplish the esterification.

The formaldehyde treatment is best accomplished by treating the acetoacetic acid ester of cellulose while in the form of filaments, threads, yarns, or the like, with an aqueous solution of formaldehyde having a temperature of 70–80° C., which formaldehyde solution contains a very small proportion of pyridine or some other mildly alkaline catalyst, particularly a tertiary organic base. The strength of the formaldehyde solution should be at least 3% and not more than 10% is ordinarily sufficient. Although the best results have been obtained with dilute formaldehyde solutions, the described effect may be obtained by treating the filaments or threads by solution of a formaldehyde-forming material in the dope or solution which is to be employed for preparing the ribbons, filaments, or threads. Also, a small proportion of mild alkaline catalyst should be incorporated. After the solution has been coated or extruded, it is desirable when a formaldehyde-forming material is used to heat the threads or ribbons for a short time at a temperature of 110–130° C. to release the formaldehyde within the material. Some of the formaldehyde-forming materials which may be incorporated in dopes or solutions in the practice of my invention are para-formaldehyde, hydroxy methyl nitroparaffins, methylol melamine, or, in fact, any formaldehyde-forming material which can be dissolved in the solution to be spun, coated, or extruded and which will release its formaldehyde at a temperature which will not decompose the filament material. I have found that the material prepared in accordance with my invention has as little as ¼ the moisture absorption of ordinary yarn-type cellulose esters. Also, these products as prepared in accordance with my invention do not melt at temperatures up to 300° C. and appear to have excellent heat stability. The amount of mild alkaline catalyst employed in the formaldehyde treatment need only be a trace, such as on the order of .001–.01%. Larger proportions of base may be present but do not exhibit any increased effect. As catalysts for use in the formaldehyde treatment, instead of pyridine there may be employed quinoline, trimethylamine, alpha or beta picoline, monoethylamine, or, for that matter, any basic material of an organic nature. If desired, an inorganic base may be employed as the catalyst for the treatment with formaldehyde. For instance, sodium hydroxide, potassium hydroxide, or ammonia may be employed for this purpose.

The following examples illustrate my invention:

*Example 1.*—54 g. of hydrolyzed cellulose acetate having an acetyl content of 39.1% were dissolved in acetone to form a clear dope. 16 g. of diketene were added and the mixture was allowed to stand twenty-four hours at room temperature. The dope remained clear and colorless and sheets were formed by coating the dope onto glass plates. The skins were air dried at 25° C. and then immersed in a 10% formalin solution containing a trace of pyridine, and the mass was heated to 80° C. for fifteen minutes. The skins were washed with water and dried. It was found that the skins were completely unaffected by acetone, methanol, and ethylene dichloride or mixtures thereof. A blank of the same type ester treated exactly in the same manner except that diketene was not added was found to be readily soluble in acetone.

*Example 2.*—40 g. of a hydrolyzed cellulose acetate having an acetyl content of 34.7% were dissolved in a mixture of acetone and methylene chloride. 5 g. of diketene were added to the dope and the mixture was heated at gentle reflux in a hot-water bath for eight hours. Skins were coated and air dried at room temperature. The skins were immersed in 10% formalin containing .1% pyridine at 80° C. for fifteen minutes. The skins were then washed, dried, and tested for solubility. It was found that these skins were completely unaffected by acetone, methanol, and ethylene dichloride. Skins obtained from a like ester by a similar process except with the omission of diketene readily dissolved in the original acetone-methylene chloride solvent.

*Example 3.*—Four-inch squares of bright and dull rayon fabric made from hydrolyzed cellulose acetate were laundered and then immersed in a 5% solution of diketene in carbon tetrachloride and refluxed for four hours. The samples were air dried and then immersed in 10% formalin solution containing .1% of pyridine at 80° C. for fifteen minutes. When dry, the rayon fabrics were softened in acetone by retained their shape.

*Example 4.*—54 g. of hydrolyzed cellulose acetate having 39% acetyl content were dissolved in 200 g. of acetone containing 1 g. of anhydrous sodium acetate. 17 g. of diketene were added to the dope and the mixture was heated to 40° C. for one hour. The mixed cellulose acetoacetate ester was precipitated in 10% acetic acid and dried. A dope was prepared and skins were coated. The skins were immersed in 10% formalin containing 0.1% sodium hydroxide and were heated at 85° C. for fifteen minutes after which they were rinsed and dried. The material was completely unaffected by the common organic solvents, softened about 300° C., and the moisture absorption was approximately ¼ that of the original cellulose ester.

*Example 5.*—The preceding example was repeated using pyridine as a catalyst for the acetoacetylation instead of sodium acetate. Similar results were obtained.

*Example 6.*—Example 4 was repeated except that N-acetyl sulfamic acid was used as the catalyst for the acetoacetylation instead of sodium acetate. Like results were obtained.

I claim:

1. A process for the preparation of a cellulose derivative insoluble in acetone which comprises reacting diketene with a reactant selected from the group of the lower fatty acid esters and the ethers of cellulose having 0.1–1.5 hydroxyl groups per C6 unit of cellulose and subsequently treating the acetoacetic acid ester obtained with an aqueous solution of a formaldehyde-supplying compound of 3–10% strength in the presence of a mildly alkaline catalyst.

2. A process for the preparation of a cellulose derivative insoluble in acetone which comprises reacting diketene with a lower fatty acid ester of cellulose having 0.1–1.5 hydroxyl groups per C6 unit of cellulose and subsequently treating the acetoacetic acid ester obtained with an aqueous solution of a formaldehyde-supplying compound of 3–10% strength in the presence of a mildly alkaline catalyst.

3. A process for the preparation of a cellulose derivative insoluble in acetone which comprises reacting diketene with a cellulose ether having 0.1–1.5 hydroxyl groups per C6 unit of cellulose and subsequently treating the acetoacetic acid ester obtained with an aqueous solution of a formaldehyde-supplying compound of 3–10% strength in the presence of a mildly alkaline catalyst.

4. A process for the preparation of a cellulose derivative insoluble in acetone which comprises reacting diketene with a reactant selected from the group of the lower fatty acid esters and the ethers of cellulose having 0.1–1.5 hydroxyl groups per C6 unit of cellulose and subsequently treating the acetoacetic acid ester obtained with an aqueour solution of formaldehyde of 3–10% strength in the presence of a mildly alkaline catalyst.

5. A process of preparing an attenuated cellulose derivative insoluble in acetone which comprises reacting diketene with a lower fatty acid ester of cellulose having 0.1–1.5 hydroxyl groups per C6 unit of cellulose, dissolving the acetoacetic acid ester thus formed, forming the solution into an attenuated product and treating the attenuated product with an aqueous solution of a formaldehyde-supplying compound of 3–10% strength in the presence of a mildly alkaline catalyst.

6. A process for forming cellulose ester filaments insoluble in acetone which comprises reacting diketene with cellulose acetate having 0.1–1.5 hydroxyl groups per C6 unit of cellulose, dissolving the cellulose acetate-acetoacetate thus formed, spinning the solution and treating the filaments thus formed with an aqueous solution of formaldehyde of 3–10% strength in the presence of a mildly alkaline catalyst.

7. A process for forming cellulose ester filaments insoluble in acetone which comprises reacting diketene with cellulose acetate having 0.1–1.5 hydroxyl groups per C6 unit of cellulose, dissolving the cellulose acetate-acetoacetate thus formed, spinning the solution and treating the filaments thus formed with an aqueous solution of formaldehyde of 3–10% strength in the presence of pyridine.

8. A method of preparing a cellulose ester insoluble in organic solvents which comprises treating a cellulose acetate-acetoacetate in which 0.1 to 1.5 hydroxyl groups of each glucose unit of cellulose are replaced by acetoacetyl groups with a dilute solution of formaldehyde in the presence of a mildly alkaline catalyst.

HUGH J. HAGEMEYER, Jr.

REFERENCES CITED

The following references are of record in the file of this patent:

UNITED STATES PATENTS

| Number | Name | Date |
|---|---|---|
| 2,103,505 | Wiezevich et al. | Dec. 28, 1937 |
| 2,108,520 | Wolf et al. | Feb. 15, 1938 |
| 2,228,452 | Gleason | Jan. 14, 1941 |

FOREIGN PATENTS

| Number | Country | Date |
|---|---|---|
| 581,460 | France | Nov. 29, 1924 |

OTHER REFERENCES

Ser. No. 340,838, Pohl et al. (A. P. C.), published June 1, 1943.